(12) United States Patent
Kollmyer et al.

(10) Patent No.: US 7,165,175 B1
(45) Date of Patent: Jan. 16, 2007

(54) APPARATUS, SYSTEM AND METHOD FOR SELECTIVELY ENCRYPTING DIFFERENT PORTIONS OF DATA SENT OVER A NETWORK

(75) Inventors: Brad Kollmyer, Lynden, WA (US); Brian Baker, Bellevue, WA (US); Eric Shapiro, Ann Arbor, MI (US); Aric Kollmyer, Mercer Island, WA (US); Mike Rutman, Gainesville, FL (US); Duncan MacLean, Santa Monica, CA (US); Dan Robertson, Ann Arbor, MI (US); Neal Taylor, Yorba Linda, CA (US); Dick Hunsche, Ann Arbor, MI (US); Amanda Walker, Reston, VA (US)

(73) Assignee: Widevine Technologies, Inc., Seattle, WA (US)

( * ) Notice: Subject to any disclaimer, the term of this patent is extended or adjusted under 35 U.S.C. 154(b) by 829 days.

(21) Appl. No.: 09/656,166

(22) Filed: Sep. 6, 2000

(51) Int. Cl.
*H04L 9/00* (2006.01)

(52) U.S. Cl. ...................................... 713/154; 709/232

(58) Field of Classification Search ................ 713/160, 713/154; 380/42, 283; 707/9; 709/250, 709/246, 232
See application file for complete search history.

(56) References Cited

U.S. PATENT DOCUMENTS

| 4,694,489 A | 9/1987 | Frederiksen |
| 5,067,035 A | 11/1991 | Kudelski et al. |
| 5,134,656 A | 7/1992 | Kudelski |

(Continued)

FOREIGN PATENT DOCUMENTS

EP    658054 B1    6/1995

(Continued)

OTHER PUBLICATIONS http://www.ntt.co.jp/news/news02e/0209/020927.html, Sep. 27, 2002.

(Continued)

*Primary Examiner*—Jacques Louis-Jacques
*Assistant Examiner*—Andrew L. Nalven
(74) *Attorney, Agent, or Firm*—Darby & Darby PC; John W. Branch

(57) ABSTRACT

An apparatus and method for selectively encrypting portions of data sent over a network between a server and a client. The apparatus includes parsing means for separating a first portion of the data from a second portion of the data, encrypting means for encrypting only of the first portion of the data, and combining means for combining the encrypted first portion of the data with the second portion of the data, wherein the second portion of the data is not encrypted. The apparatus further includes decrypting means installed at the client for decrypting the encrypted portion of the data. The apparatus is platform independent in terms of media format and data protocol. The encryption unit encrypts data transparently to the client based on the media format. The apparatus of the invention is implemented as one of an application and a plug-in object. The method for selectively encrypting portions of data which differ from each other in at least on characteristic sent over a network between a server and a client includes parsing the data into a first and second portion, encrypting only the first portion of the data, and sending the encrypted first portion and the second portion of the data over the network to the client. The method further includes receiving data from the server, determining whether a data stream is established between the server and the client, and negotiating an encryption key with a decryption shim of the client.

94 Claims, 5 Drawing Sheets

U.S. PATENT DOCUMENTS

| | | | |
|---|---|---|---|
| 5,144,663 A | | 9/1992 | Kudelski et al. |
| 5,161,193 A | * | 11/1992 | Lampson et al. ............ 713/151 |
| 5,375,168 A | | 12/1994 | Kudelski |
| 5,420,866 A | * | 5/1995 | Wasilewski ................. 370/426 |
| 5,539,450 A | | 7/1996 | Kudelski et al. |
| 5,590,200 A | | 12/1996 | Nachman et al. |
| 5,592,212 A | | 1/1997 | Handelman |
| 5,621,799 A | | 4/1997 | Katta et al. |
| 5,640,456 A | | 6/1997 | Adams, Jr. et al. |
| 5,640,546 A | | 6/1997 | Gopinath et al. |
| 5,666,412 A | | 9/1997 | Handelman et al. |
| 5,678,002 A | * | 10/1997 | Fawcett et al. ............. 715/709 |
| 5,684,876 A | | 11/1997 | Pinder et al. |
| 5,758,257 A | | 5/1998 | Herz et al. |
| 5,774,527 A | | 6/1998 | Handelman et al. |
| 5,774,546 A | | 6/1998 | Handelman et al. |
| 5,796,836 A | * | 8/1998 | Markham .................... 380/28 |
| 5,799,089 A | | 8/1998 | Kuhn et al. |
| 5,805,705 A | | 9/1998 | Gray et al. |
| 5,878,134 A | | 3/1999 | Handelman et al. |
| 5,883,957 A | | 3/1999 | Moline et al. |
| 5,892,900 A | | 4/1999 | Ginter et al. |
| 5,910,987 A | | 6/1999 | Ginter et al. |
| 5,915,019 A | | 6/1999 | Ginter et al. |
| 5,917,912 A | | 6/1999 | Ginter et al. |
| 5,920,625 A | | 7/1999 | Davies |
| 5,920,861 A | | 7/1999 | Hall et al. |
| 5,922,208 A | | 7/1999 | Demmers |
| 5,923,666 A | | 7/1999 | Gledhill et al. |
| 5,933,498 A | | 8/1999 | Schneck et al. |
| 5,939,975 A | | 8/1999 | Tsuria et al. |
| 5,943,422 A | | 8/1999 | Van Wie et al. |
| 5,949,876 A | | 9/1999 | Ginter et al. |
| 5,982,891 A | | 11/1999 | Ginter et al. |
| 5,991,399 A | * | 11/1999 | Graunke et al. ............. 380/279 |
| 6,009,116 A | | 12/1999 | Bednarek et al. |
| 6,009,401 A | | 12/1999 | Horstmann |
| 6,009,525 A | | 12/1999 | Horstmann |
| 6,021,197 A | | 2/2000 | von Willich et al. |
| 6,035,037 A | | 3/2000 | Chaney |
| 6,038,433 A | | 3/2000 | Vegt |
| 6,044,468 A | * | 3/2000 | Osmond ........................ 726/5 |
| 6,049,671 A | | 4/2000 | Slivka et al. |
| 6,055,503 A | | 4/2000 | Horstmann |
| 6,073,256 A | | 6/2000 | Sesma |
| 6,112,181 A | | 8/2000 | Shear et al. |
| 6,138,119 A | | 10/2000 | Hall et al. |
| 6,141,686 A | * | 10/2000 | Jackowski et al. ........... 709/224 |
| 6,154,840 A | * | 11/2000 | Pebley et al. ................ 713/160 |
| 6,157,721 A | | 12/2000 | Shear et al. |
| 6,178,242 B1 | | 1/2001 | Tsuria |
| 6,185,683 B1 | | 2/2001 | Ginter et al. |
| 6,189,097 B1 | | 2/2001 | Tycksen, Jr. et al. |
| 6,191,782 B1 | | 2/2001 | Mori et al. |
| 6,226,794 B1 | | 5/2001 | Anderson, Jr. et al. |
| 6,237,786 B1 | | 5/2001 | Ginter et al. |
| 6,240,185 B1 | | 5/2001 | Van Wie et al. |
| 6,247,950 B1 | | 6/2001 | Hallam et al. |
| 6,253,193 B1 | | 6/2001 | Ginter et al. |
| 6,256,668 B1 | | 7/2001 | Slivka et al. |
| 6,272,636 B1 | | 8/2001 | Neville et al. |
| 6,285,985 B1 | | 9/2001 | Horstmann |
| 6,292,569 B1 | | 9/2001 | Shear et al. |
| 6,298,441 B1 | | 10/2001 | Handelmann et al. |
| 6,314,409 B1 | | 11/2001 | Schneck et al. |
| 6,314,572 B1 | | 11/2001 | LaRocca et al. |
| 6,334,213 B1 | | 12/2001 | Li |
| 6,363,488 B1 | | 3/2002 | Ginter et al. |
| 6,389,402 B1 | | 5/2002 | Ginter et al. |
| 6,405,369 B1 | | 6/2002 | Tsuria |
| 6,409,080 B1 | | 6/2002 | Kawagishi |
| 6,409,089 B1 | | 6/2002 | Eskicioglu |
| 6,424,717 B1 | * | 7/2002 | Pinder et al. ................ 380/239 |
| 6,427,140 B1 | | 7/2002 | Ginter et al. |
| 6,449,367 B1 | | 9/2002 | Van Wie et al. |
| 6,449,651 B1 | * | 9/2002 | Dorfman et al. ............ 709/229 |
| 6,449,719 B1 | | 9/2002 | Baker |
| 6,459,427 B1 | | 10/2002 | Mao et al. |
| 6,466,670 B1 | | 10/2002 | Tsuria et al. |
| 6,505,299 B1 | | 1/2003 | Zeng et al. |
| 6,587,561 B1 | | 7/2003 | Sered et al. |
| 6,618,484 B1 | | 9/2003 | Van Wie et al. |
| 6,629,243 B1 | | 9/2003 | Kleinman et al. |
| 6,634,028 B1 | | 10/2003 | Handelmann |
| 6,640,304 B1 | | 10/2003 | Ginter et al. |
| 6,651,170 B1 | | 11/2003 | Rix |
| 6,654,420 B1 | | 11/2003 | Snook |
| 6,654,423 B1 | | 11/2003 | Jeong et al. |
| 6,658,568 B1 | | 12/2003 | Ginter et al. |
| 6,668,325 B1 | | 12/2003 | Collberg et al. |
| 6,931,532 B1 | * | 8/2005 | Davis et al. ................. 713/167 |
| 2003/0007568 A1 | | 1/2003 | Hamery et al. |

FOREIGN PATENT DOCUMENTS

| | | |
|---|---|---|
| EP | 714204 B1 | 5/1996 |
| WO | WO-96/06504 A1 | 2/1996 |
| WO | WO-96/32702 A1 | 10/1996 |
| WO | WO-99/30499 A1 | 6/1999 |
| WO | WO-99/54453 A1 | 10/1999 |
| WO | WO-01/35571 A1 | 5/2001 |
| WO | WO-02/21761 A2 | 3/2002 |

OTHER PUBLICATIONS

Coverage and Generalization in an Artificial Immune System, Balthrop, et al., 2002.
Video Protection by Partial Content Corruption, C. Griwodz, Sep. 1998.
An Overview of Multimedia Content Protection in Consumer Electronics Devices, Eskicioglu et al.
Performance Study of a Selective Encryption Scheme for the Security of Networked, Real-Time Video, Spanos et al., 1995.
Goonatilake, Suran, ed. et al., Intelligent Systems for Finance and Business, 1995, chapters 2-10, pp. 31-173.
Irdeto Access and Optibase create Strategic Alliance—Dec. 14, 2000, http://www.irdetoaccess.com/press/0000041.htm.
System Security, Streaming Media, S. Blumenfeld, Oct. 2001.
http://www.cs.unm.edu/~forest/projects.html, Dec. 2, 2003.
Partial Encryption for Image and Video Communication, H. Cheng, 1998.
A Review of Video Streaming Over the Internet, Hunter et al., Dec. 2, 2003.
Standards Track, Schulzrinne, et al., Apr. 1998, pp. 1-86.
http://www.optibase.com/html/news/December_14_2000.html, Dec. 14, 2004.
Omneon Video Networks Product Announcement, Broadband Streaming, pp. 1-4.
Yoshida, Kazuhiro, et al., "A Continuous-media Communication Method for Minimizing Playback Interruptions", IS&T/SPIE Conference on Visual Communications and Immage Processing, Jan. 1999, San Jose, California, vol. 3653.
Communication pursuant to Article 96(2) EPC dated Jan. 26, 2006 (for EP Application No. 01968511.4).
PCT Notification of Transmittal Of The International Search Report; PCT/US 01/27518; Applicant: Widevine Technologies, Inc.; pp. 1-7.

\* cited by examiner

APPARATUS, SYSTEM AND METHOD FOR SELECTIVELY ENCRYPTING DIFFERENT PORTIONS OF DATA SENT OVER A NETWORK

BACKGROUND OF THE INVENTION

1. Field of the Invention

The present invention generally relates to transmission of data over a network and, more specifically, to an apparatus, system and method for selectively encrypting and decrypting different portions of data sent over a network.

2. Description of Related Art

Networking, today exemplified by the Internet, began as a way for users to share text-based information and files. The technology has, however, advanced far beyond text. The Internet can be used to conduct videoconferences where the participants in the conference can see each other in real-time on their computer screens or network-connected conferencing device. Internet users can watch live video footage of events as they happen, or view pre-recorded programming "on demand," i.e., whenever they choose rather than on a broadcast schedule.

To understand how video and multimedia content is transmitted over the Internet, first it is necessary to understand the concept of streaming. Streaming solves a long-standing problem inherent in transmitting media information across the Internet: multimedia files are quite large, and most users have relatively low-bandwidth network connections. Sending broadcast-quality video or CD-quality audio across the Internet has never been easy or practical. It could take hours to send a single audio or video file across the network to someone's computer. The person at the other end would have to wait until the entire file was downloaded before playback could begin. Playback might last only a few minutes.

It has long been possible to reduce the amount of data required to transmit multimedia material. One way is to reduce the resolution, frame rate or sampling rate of the transmitted data, which has the side effect of reducing the perceived quality of the audio or video content. Another commonly used method is to apply data compression to the data to remove redundancies and retain only the most essential data from a multimedia file. By combining these two techniques, it is possible to produce multimedia files of reasonable quality that can be transmitted over typical Internet connections in time frames similar to the running time of the media content itself, i.e. minutes instead of hours. The actual quality of downloaded multimedia material varies depending on the available network bandwidth and the willingness of the user to wait for it to arrive; it is possible to trade off quality against file size and to prepare higher-quality versions of the content for users with more bandwidth.

When the amount of data per second of multimedia content is equal to or less than the amount of bandwidth available to a network user, streaming can occur. Streaming is essentially "just-in-time" delivery of multimedia data. The user does not need to wait for the entire file to arrive before s/he can begin viewing it, nor does s/he need to dedicate a large piece of his/her computer's storage to the received data. As it arrives at the client computer, the multimedia data is typically stored in a buffer capable of holding several seconds' worth of data, in order to avoid interruptions in playback caused by erratic network connections. When the buffer is initially filled, which happens in seconds rather than minutes or hours, playback begins, and individual frames of video and/or audio segments are retrieved from the buffer, decoded, and displayed on the client's video monitor, played through the client's sound system, or otherwise played back via the client's network connected device. After the data has been played, it is in many cases discarded and must be transmitted again if the user wishes to review a previous portion of the program.

The World Wide Web ("Web") operates on a client/server model; that is, a user (i.e. a client) runs a piece of software on his/her personal computer or other network device (such as a network appliance or Internet capable wireless phone) capable of accessing the resources of a network server. The server can allow many different users to access its resources at the same time and need not be dedicated to providing resources to a single user. In this model, the client software—e.g. a browser or player—runs on the user's computer. When a user requests a video or other multimedia content on the Web, his/her client software contacts the Web server containing the desired information or resources and sends a request message. The Web server locates and sends the requested information to the browser or player, which displays the results by interpreting the received data as appropriate, e.g. displaying it as video on the computer's display.

Information on the Web is addressed by means of Uniform Resource Locators (URLs). A URL specifies the protocol to be used to access the required information (commonly HTTP, the HyperText Transfer Protocol), the address or Internet name of the host containing the information, any authentication information required to gain access to the information (such as a User ID and Password), an optional TCP/IP port number if the resource is not available on the standard port for the specified protocol, and a path to the desired information in a virtual hierarchy designated by the server operators. Additionally, the URL can contain information entered by the user such as query text for a database search. URLs can be specified in many ways, including but not limited to typing them into a Web client, by clicking a "hyperlink" in some other Web document, by choosing a "bookmark" in a Web browser to return to a previously-visited page, or by filling out a Web form and submitting it to the server.

When a request is made for a particular URL, the request is sent to the appropriate server using the protocol indicated in the URL, such as HTTP, and the requested data (or an error message if the request cannot be fulfilled) is returned by the same method. However, HTTP and other Web protocols are built on top of fundamental Internet protocols, such as TCP (Transmission Control Protocol) or UDP (User Datagram Protocol). The protocols used for streaming media are built on top of these fundamental protocols in the same way that other high-level protocols, such as HTTP, are. It is essential to realize that all Internet traffic is carried by a relatively small number of low-level, fundamental protocols such as TCP and UDP, which are used to establish the connection between computers that carries the higher-level protocol. When streaming multimedia content, then, the server may use either TCP or UDP.

RTP (Real-Time Protocol), RTSP (Real-Time Streaming Protocol), RTCP (Real-Time Control Protocol) are three of the many possible streaming media protocols that can be built on top of the Internet's low-level protocols. In fact, RTP, RTSP, and RTCP serve complimentary functions and are most often used together as part of some of the more common streaming implementations. RTSP is used to set up and manage a streaming connection to between a server and a client, RTP is used to deliver the actual multimedia data, and RTCP provides timing and other control signals between the client and the streaming server. Often, RTP is sent on top of UDP, a low-overhead protocol that delivers the data as quickly as possible, but does not guarantee that any particular piece of data (a "packet" in network terminology) will actually arrive at its destination. RTCP packets are sent interleaved with the data or in parallel with the RTP media channel via TCP.

One serious drawback of using the Internet for the distribution of streaming media is that the data of necessity often passes through networks and systems that are not controlled by the sender of the data en route to the client. Once the data leaves the sender's protected network, it is vulnerable to interception. This is of particular concern when proprietary data, such as a motion picture, is transmitted across the network, be it the public Internet or a third party private network. The data can potentially be intercepted and copied at any point as it is transmitted across these networks. Without some way to protect data from interception and unauthorized duplication, the Internet will never provide the security necessary to allow copyright owners to safely distribute their works over the network.

Encryption is one way to address this issue. Encryption provides a way to encode information such that only the intended recipient can view it. While anyone can intercept the data, only the legitimate recipient will be able to decrypt it, retrieve the original message or media content, and display it. Many encryption solutions have been created to provide this type of security. For example, software referred to as VPN (Virtual Private Network) allows a group of computers connected to the Internet to behave as if they were connected to a physically secure local network, using encryption to ensure that only computers on the VPN can access the private network resources. Other applications of encryption to allow private communications over the Internet include but are not limited to PGP (Pretty Good Privacy), IPSec (IP Security) and SSL (Secure Sockets Layer).

Organizations, often but not limited to corporations, also protect their proprietary data by use of firewalls. Every time a corporation connects its internal computer network or local area network (LAN) to the Internet, it faces a similar problem of private data being intercepted. Whereas encryption is used to ensure that data sent through the public Internet is usable only by intended recipients, firewalls are aimed at keeping proprietary information secure on a LAN which is connected to the Internet by preventing unauthorized users from accessing information stored on the internal network via the public Internet. Due to the Internet's public nature, every LAN connected to it is vulnerable to attack from the outside. Firewalls allow anyone on the protected LAN to access the Internet in ways allowed by the firewall configuration, while stopping hackers on the Internet from gaining access to the LAN and stealing information and/or deleting or otherwise vandalizing valuable data.

Firewalls are special-purpose devices built on routers, servers, and specialized software. One of the simplest kinds of firewalls uses packet filtering. In packet filtering, a router screens each packet of data traveling between the Internet and the LAN by examining its header. Every TCP/IP packet has a header containing the IP address of the sender and receiver as well as the port number of the connection and other information. By examining the header, and particularly the port number, the router can determine with a fair amount of accuracy the type of Internet service each packet is being used for. Each Internet service, including HTTP (the Web), FTP (File Transfer Protocol), Telnet, rlogin, and many others, has a standard port number that is used by convention for most access to the service. While any port number can be used for any service, it is far more convenient for users to use the standard port numbers, and virtually all Internet services intended for access by the public do so. Once the router knows what client and what service a packet is intended for, it can simply block outside access to hosts and services that public Internet users should not be able to use. System administrators set the rules for determining which packets should be allowed into the network and which should be blocked.

Proxy servers are commonly used in conjunction with firewalls. A proxy server is a software gateway that runs on a computer that is accessible by both the protected LAN and the Internet. All access to the Internet from the LAN must go through the proxy server, as must all access to the LAN from the public Internet. When a computer on the LAN requests an Internet resource such as a Web page, that request is sent to the proxy server. The proxy server then makes the request to the Internet resource and forwards any returned data back to the original requester on the LAN. Since the Internet and the LAN touch only at the single point of the proxy server, which acts as a go-between, protecting the network involves securing only one computer, rather than dozens or hundreds. Proxy servers are frequently used by employers to control and monitor how their employees use the Internet, as well as for preventing intrusion attempts from the Internet.

NAT, the term used for networks that utilize Network Address Translation, complicates delivery of Internet data as well. In a NAT, a privately addressed network is established separated from the Internet by a NAT router. This router in turn has an address on the public Internet. By translating the addresses of the private network into addresses recognizable on the public Internet and vice versa, the NAT router facilitates Internet connectivity for the privately networked machines. NATs are often used where limited numbers of public addresses are available in comparison to the number of users (a user might use a NAT for multiple machines sharing a cable modem connection) or in conjunction with firewalls and/or proxies to provide an extra layer of security to the private network.

Data packets can be typically divided into two parts, the header and the payload parts. The header is the portion of the packet that includes routings or other configuration information. The payload is the portion of the data packet that is just the data of interest, in exemplary case: multimedia content. For example, in a network packet, the header contains data for use by network routers in delivering the packet to its final destination, as well as other data about the packet such as size and formatting information. In an exemplary RTP packet, the header contains channel information as well as other information needed by the player to direct the RTP (media content) payload. Some complex packets may contain multiple headers and diverse non-payload information and will be referred to herein as the non-payload part.

Many current encryption solutions, such as IPsec, encrypt data far too indiscriminately, encrypting not only the payload but portions of the header or non-payload part as well. Only the routing information remains unencrypted, thereby rendering information needed for firewalls, proxies and/or NATs to appropriately relay the packets scrambled which will stop the packet before it can transit into a private or protected network. Other solutions provide inadequate encryption to assure integrity of the data across the public network. Some streaming media encryption solutions deal with the problem by placing the encryption system on the server machine in the form of special software that encrypts the streaming media before it is converted to packets for network transmission. While this results in packets that can often successfully pass through proxy servers and firewalls, this strategy is limiting. This is because this solution requires modification of the streaming server and often requires the addition of extra streaming servers or processing capacity to handle the increased workload that encryption adds. Also, the solution must be reengineered for each streaming server platform supported.

BRIEF SUMMARY OF THE INVENTION

The present invention solves the above and other problems by providing an apparatus, system and method that parse and selectively encrypt different portions of the data in real-time, decrypt the encrypted data in real-time and pass the data to a media player on a client computer or other network capable device. In particular, there is provided an encryption bridge that examines, parses and selectively encrypts only the payload (e.g. Media content) portion of the data, leaving the non-payload portion intact such that the data can cross firewalls, proxies and NATs without the firewalls, proxies or NATs having to be modified to accommodate the encrypted data. The invention ensures that it does not encrypt the portion of the data stream that firewalls, proxies, and NATs require to properly deliver the data to the intended recipients (e.g. Client computer). Thus, if the encryption unit does not see a data type that it specifically recognizes, then it ignores it, but if the encryption unit sees a data type that it does recognize (e.g. Multimedia content), then it selectively encrypts only the recognized portion of the data stream.

BRIEF DESCRIPTION OF THE SEVERAL VIEWS OF THE DRAWING

The accompanying drawings, which are incorporated in and constitute a part of this specification, illustrate at least one exemplary embodiment of the invention and, together with the description, explain the various advantage and principles of the invention. In the drawings.

DETAILED DESCRIPTION OF THE INVENTION

The following detailed description refers to the accompanying drawing, which illustrates the exemplary embodiment of the present invention. Other embodiments are possible and modifications may be made to the exemplary embodiments without departing from the spirit and scope of the invention. Therefore, the following detailed description is not meant to limit the invention. Rather, the scope of the invention is defined by the appended claims.

Figure 1:
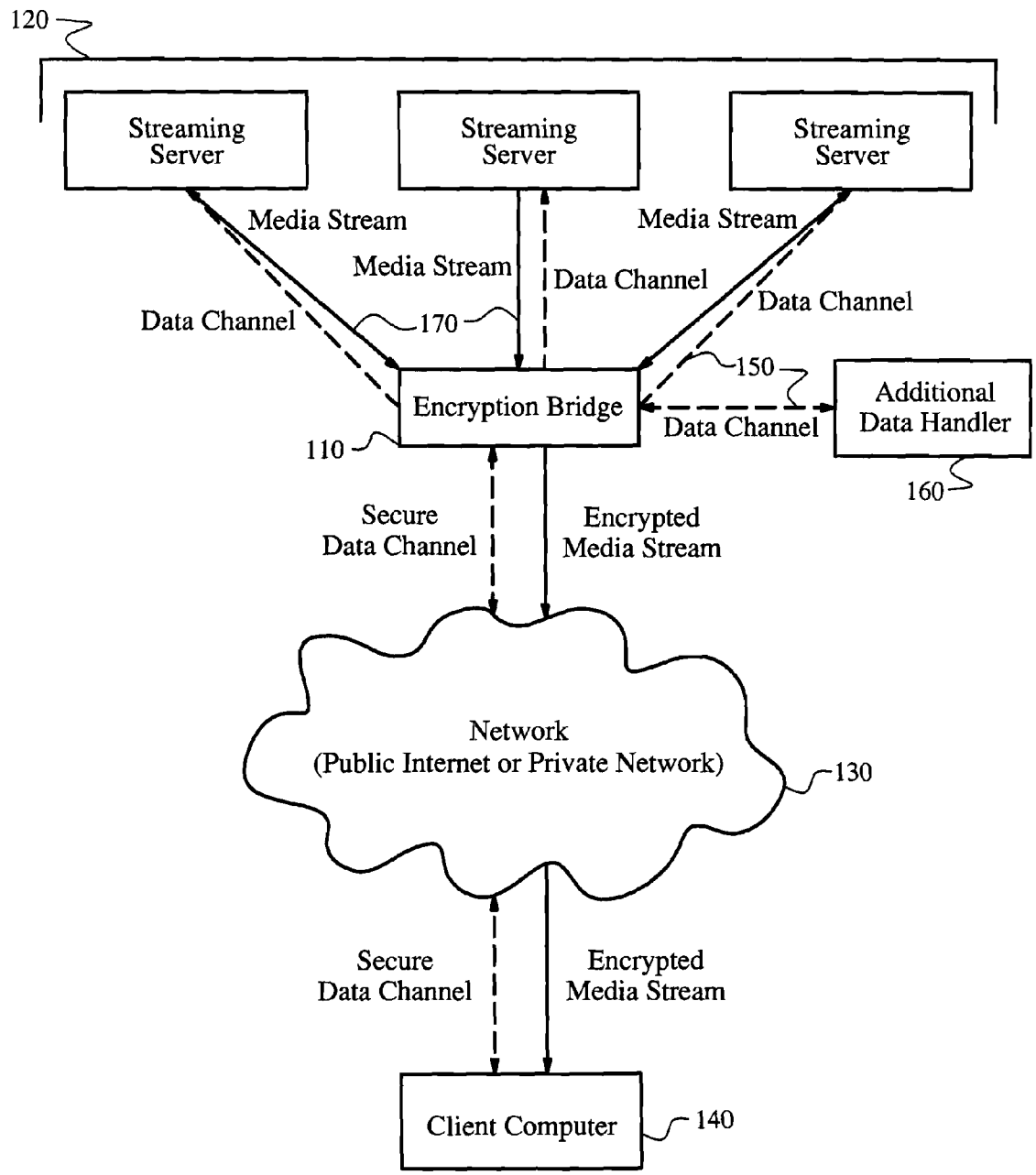
FIG. 1 is an illustration of an exemplary computer system on which an encryption bridge may be implemented.

FIG. 1 illustrates an exemplary computer system 100 which includes an encryption bridge (also referred to as "EB") 110 of the invention interposed between the streaming servers 120, which provide media streams (payload data) 170, and an outside network such as the Internet 130, and a user or client computer 140. The EB 110 operates such that as data is sent through EB 110, only selected portion of the data (e.g., multimedia data) are encrypted. The EB 110 can be set up such that it encrypts other data as well. For example, the EB 110 can be configured to encrypt/protect data that might include but is not limited to electronic books, medical records or images, financial data or any other data that requires secure transmission over a network.

The EB 110, which may represent a single machine or a cluster of machines, is interposed between servers 120 and the Internet 130. All pertinent data moving from the servers 120 and the Internet 130 via the EB 110 needs to be made secure by encryption; traffic between the EB 110 and the servers 120, however, does not have to be encrypted since it is in a "safe zone" by virtue of not being exposed to the outside network. Data channels 150 may represent control data such as pause, play and rewind or speed modulation data for the streaming servers 120 or can be used for more complex data forms and monitoring. Additionally, the data channels 150 can be used to hand this monitoring data off to other machines such as e-commerce or quality monitoring servers for services not directly related to the stream encryption process.

The EB 110 passes data to network clients 140 and ensures that the data owners or content providers (e.g. Yahoo, Inc., AOL, Inc., etc.) that the data from their streaming servers 120 will be securely encrypted while traversing the Internet 130 and that once on the client machine 140 the data will be difficult to copy. Security on the client machine 140 can be accomplished by a variety of techniques, including but not limited to checking for and preventing known piracy techniques and monitoring the client machine 140 for suspicious behavior. The streaming servers 120 and the clients 140 are the ultimate sources and destinations, respectively, of the data streams (e.g. multimedia content) 170 and data channels (e.g. control data) 150 transported via the EB 110. An additional data handler (e.g. e-commerce system, quality monitoring system, etc.) 160 may also be connected to the EB 110, which is further described below.

The streaming server 120 operators (e.g. content owners or service providers to content owners) are the system's primary customers, which provide the content to transmissions requested by a client 140 over a network such as the Internet 130. The client 140, for the purpose of this example, is equipped with media playback software. For this example, the media playback software could be the Apple Computer Quicktime™ Player, Real Player™, the Windows Media Player™ or any other software capable of playing back multimedia streams. The Internet 130 is a public network. The data handler 160 is, for example, an e-commerce system or other outside monitoring or data system that a customer may choose to utilize in conjunction with a streaming security solution.

Figure 2:
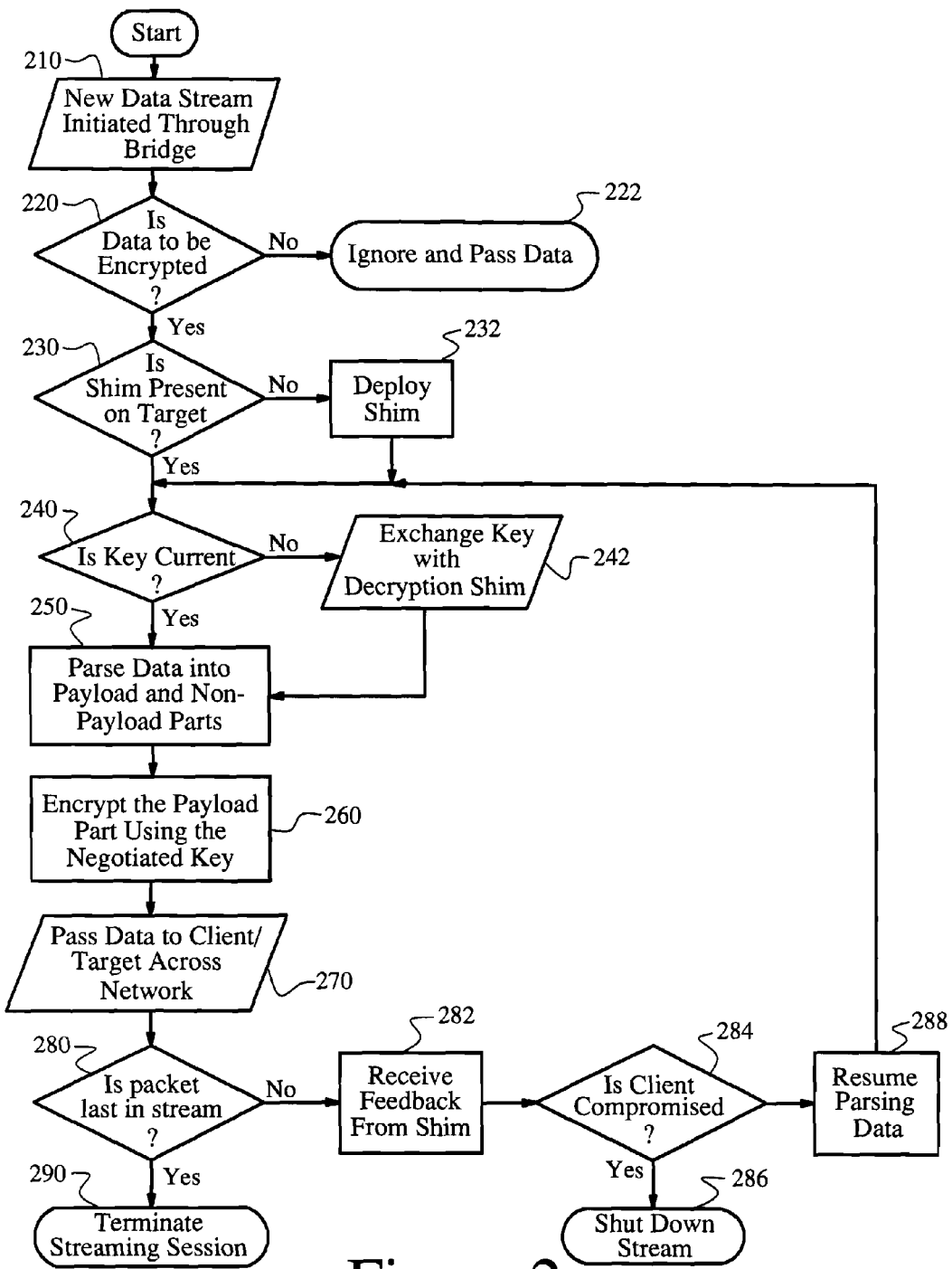
FIG. 2 is a flowchart of an exemplary encryption process.

FIG. 2 is a flowchart of an exemplary encryption process of the invention for parsing and selectively encrypting data being sent over a public network between a server and a client. This process comprises recognizing a new data stream arriving at the EB 210; determining whether the data is to be encrypted 220; ignoring and passing the data stream if it is not to be encrypted 222; determining whether a shim is present on the client/target 230; deploying the shim if it is not already present 232; determining whether an encryption key is current 240; exchanging encryption key(s) with the client side shim if the key was not current 242; parsing data into payload and non-payload parts 250; encrypting the payload part using the exchanged key 260; passing the data consisting of payload and non-payload parts across the network 270; determining whether the processed data is last in the stream 280; receiving feedback from the shim if the data was not the final part of the stream 282; determining if the client is compromised 284 (e.g. is hacked or the data needing security is otherwise placed at risk); shutting down the data stream if the client is compromised 286; resuming the parsing of the established stream if the client is not compromised 288; and terminating the streaming session if the data was the last in the stream 290.

Benefits of the EB system include: the EB fits beside the customers' streaming server system with minimal integration costs; there is no need to modify the server system for the EB to work; the EB is transparent to both client side software and the streaming server system with client software appearing to communicate with the servers without an unexpected intermediary and servers delivering data to clients without detecting the ongoing encryption process.

In addition, the EB system provides parsing and encryption for a variety of data types and streams including but not limited to Windows Media™ format and RTP/RTSP using TCP, TCP/UDP or http delivery. All payload data sent via these formats are encrypted as the data travels from the server through the EB to the client.

Encryption is accomplished via an encryption algorithm such as DES-X, a technique well known in the art, and other algorithms can be substituted depending on customer and other needs. The parsing and encryption of the data streams does not interfere with the stream's ability to pass through proxy server, firewalls or NATs that parse packets to facilitate delivery of data to a protected LAN. This is an important feature of the invention since the applicants are not aware of any software that parses for content on a selective basis and subsequently acts on just the payload part of the data like the present invention. Moreover, outside authentication is not required since the EB handles exchange of encryption keys directly with the client.

In addition, the EB is scalable to allow the addition of more encryption machines as the bandwidth increases. The encryption machines are scalable to allow the addition of additional processor and network cards to handle increased bandwidth. This allows the system maximum growth with minimal increase in the physical size of the EB.

As more encryption machines are added to the EB, the encryption is spread out among those available encryption machines to maximize throughput. The EB can be configured while it is online to: add or remove encryption machines; shutdown the EB; prevent the system from accepting new streams and allow existing streams to run out; read status to tell that a given encryption machine is no longer servicing streams and can be safely removed from the system; and gather data on streaming capacity, usage and quality of data transferred via the EB.

In addition, the EB and shim architecture provide pluggable cores for changing and maintaining features such as the encryption algorithm and client side security monitors. A pluggable core is modular code that allows portions of the whole program to be readily replaced without disturbing the remaining functionality. For example, the invention allows the EB to encrypt with a variety of algorithms such that when a new data stream is established through the EB, a new encryption core could be sent to the client to allow the payload part to be encrypted with a different algorithm (e.g. Blowfish or RSA™ instead of DES-X). Stated another way, the encryption algorithm can be changed at any time since the software architecture is entirely pluggable/exchangeable. As to the key exchange system, though currently standard protocols are used, they can be changed at any time since this architecture is also pluggable/exchangeable. As to the client side security system (i.e. hacker detection), this too can be altered at any time since the architecture is pluggable/exchangeable. All core functionality of the client side shim is implemented via this pluggable/exchangeable architecture.

Another novel aspect of the invention is the "on-the-fly" encryption, which makes data packets that are transmitted over the network useless to any computer other than the intended machine. This is done transparently relative to the client media playback mechanism (e.g. media player software) and server and in real-time. The initial implementation of the invention utilizes DES-X, a speed optimized algorithm well-known in the art, though via the pluggable core architecture noted above this could be changed out for other algorithms that may include but are not limited to RSA™ algorithms or the widely known Blowfish and Two-Fish algorithms.

Thus, the invention provides a software bridge that examines network data passing through, parses the network data and only encrypts the relevant payload part, leaving the non-payload part that may include data such as routing, size and other header data surrounding the payload part entirely untouched. In other words, certain portions of the data are encrypted and other portions of the data are not or do not need to be encrypted. What the systems and methods of the invention do is parse the network and actually look at the data format, encrypting only the portion of the data that contains, in the exemplary case, multimedia content. Selectivity of the data to be encrypted is based on the format of the data sent, which the EB recognizes and responds to appropriately. The EB of the invention sits in between the servers and clients and encrypts the data. Decryption takes place on the client using the shim and pluggable cores as noted above. This way, the data if intercepted on the network is encrypted and useless to the interceptor. The data cannot be intercepted prior to encryption since the EB and servers are connected via a secure network connection.

As stated above, the encrypted data stream of the invention can pass through a proxy server, firewall or NAT without those mechanisms needing to be modified to accommodate the data stream. A benefit of the invention over current encryption solutions is the ability to produce encrypted data streams that can cross through proxy servers, firewalls and NATs. This ability to produce data that crosses unmodified proxy servers, firewalls and NATs results from the invention's ability to selectively parse data into payload and non-payload parts and encrypt only the payload part, a level of selectivity that current encryption solutions do not provide.

For the streaming server operators this becomes very significant since many home, office and other networks are protected or isolated from the public Internet by firewalls, proxy servers and/or NATs. With current encryption solutions that encrypt data less discriminately, the data is unable to be delivered across unmodified firewalls, proxy servers and NATs.

For instance, when a user requests data from a streaming server, that data stream is organized into packets that have specific data for identifying the target user. Without accurately parsing the data into payload and non-payload parts, the user specific data is readily damaged or scrambled during the encryption process, making it impossible for the firewall, proxy server or NAT to deliver the data to the requesting user. In contrast, the present invention accurately separates the payload and non-payload parts, encrypting only the payload part so that the data appears unchanged to the firewall, proxy server or NAT that requires only the non-payload part to affect delivery to the user requesting the data stream.

A firewall, for example, does not recognize or try to block the encrypted data stream because the transport protocols do not define the appearance of the payload part, only the appearance of the non-payload part. The firewall looks at the non-payload part including but not limited to size, routing and header data. If the non-payload part data identify the data stream as a reply to a user request, then firewall determines that the data stream is not malicious in origin and will not prevent it from going through. However, if the firewall is unable to parse the non-payload part or does not recognize the non-payload part than the data will be blocked from passing through.

In existing encryption solutions where the entire data portion of packets is encrypted, special modifications in each firewall, proxy server or NAT that the data stream might pass through are necessary. That is, the firewalls, proxy servers and NATs would have to be updated to identify the encrypted data. The present invention does not require modifications of the firewalls, proxy servers or NATs already deployed because it selectively encrypts the data packets leaving the portions important to firewalls, proxy servers and NATs unchanged such that the firewall, proxy server or NAT can pass the data stream to the intended target.

Some existing encryption solutions exist that encrypt only the media portion of a data stream by placing the encryption software on the streaming server as a plug-in to streaming server software, placing a heavy processing burden on the streaming server. This is in contrast to a benefit of the invention in that the invention can be used with a plurality of streaming servers without modification being required to the streaming servers and providing encryption without impacting the processing performance of the streaming servers.

Another feature of the invention is it provides a system that is independent in terms of the media format used. That is, the invention operates based on data protocol rather than file format. Multimedia streaming over networks is accomplished via several protocols. The invention recognizes the streaming protocol and acts on the data rather than requiring specific identification of the file format being transmitted. The invention is also independent in terms of the operating systems on the server machines since the invention requires no direct access to the server machines, the invention merely requires that the data streams from the streaming server pass through the EB.

Figure 3:
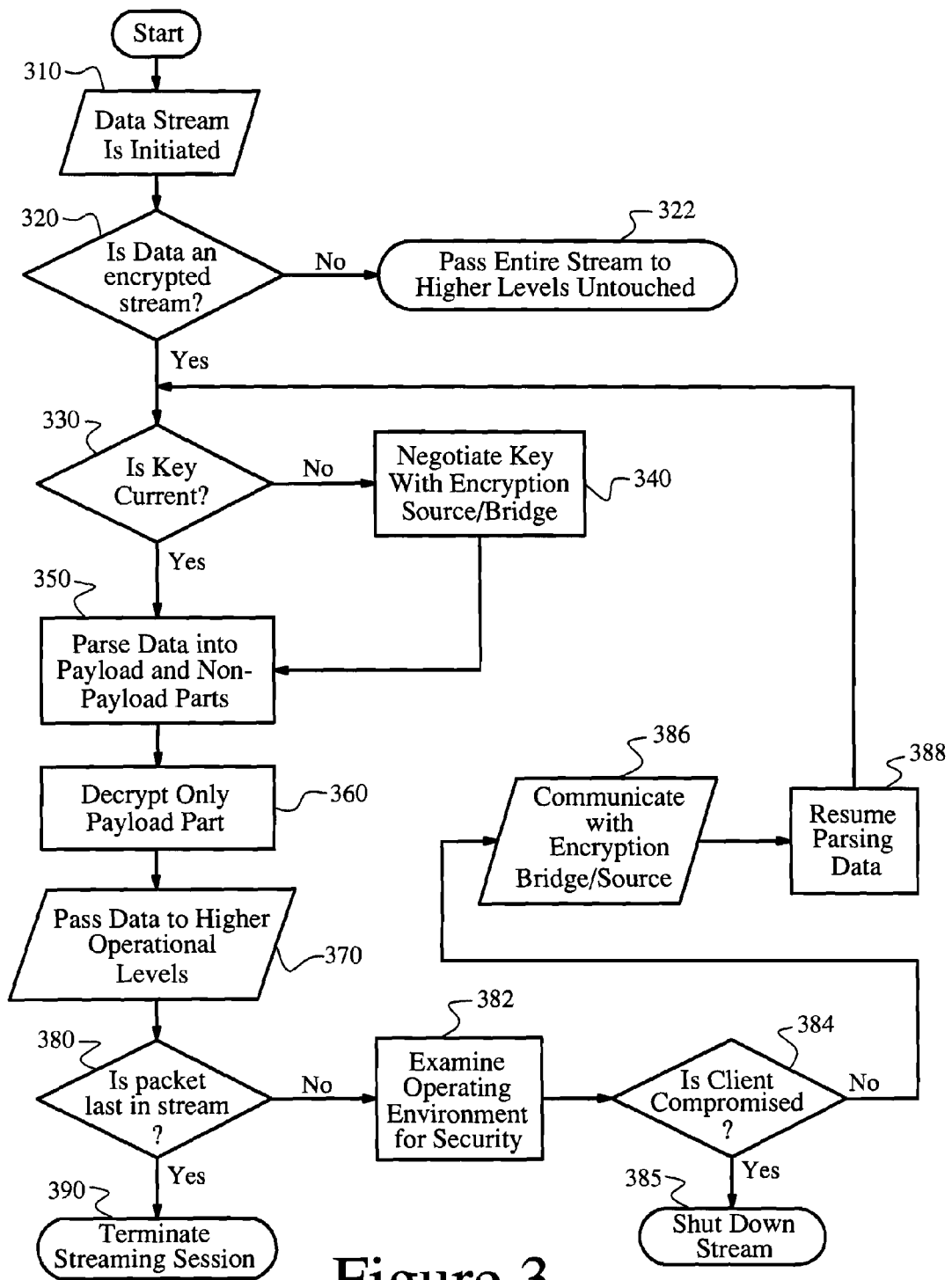
FIG. 3 is a flowchart of an exemplary decryption process.

The invention further provides a client system, also referred to as a decryption shim or simply a shim, which is a piece of transparent software that is downloaded to or pre-installed on the client machine (e.g. personal computer, network appliance or other network capable device) and used to decrypt incoming data streams from the EB on its way to the media player software. FIG. 3 is a flowchart of an exemplary decryption process of the decryption shim software performed at the client machine. The process comprises data streams as they are initiated 310; determining whether the data is an encrypted stream 320; ignoring the stream if it is not encrypted data 322; determining if the encryption key is current 330; negotiating a key with the encryption bridge/source if the key is not current 340; parsing the data into payload and non-payload parts 350; decrypting only the payload part 360; passing the data to higher level operations (e.g. the media player) 370; determining whether the data is the last part of a stream 380; examining the operating environment for security 382; determining if the client environment is compromised (hacked, etc.) 384, shutting down the data stream if the client is compromised 385; communicating with the encryption bridge/source 386; resuming parsing data 388; and terminating the stream if the data was the last part of the stream 390.

Figure 4:
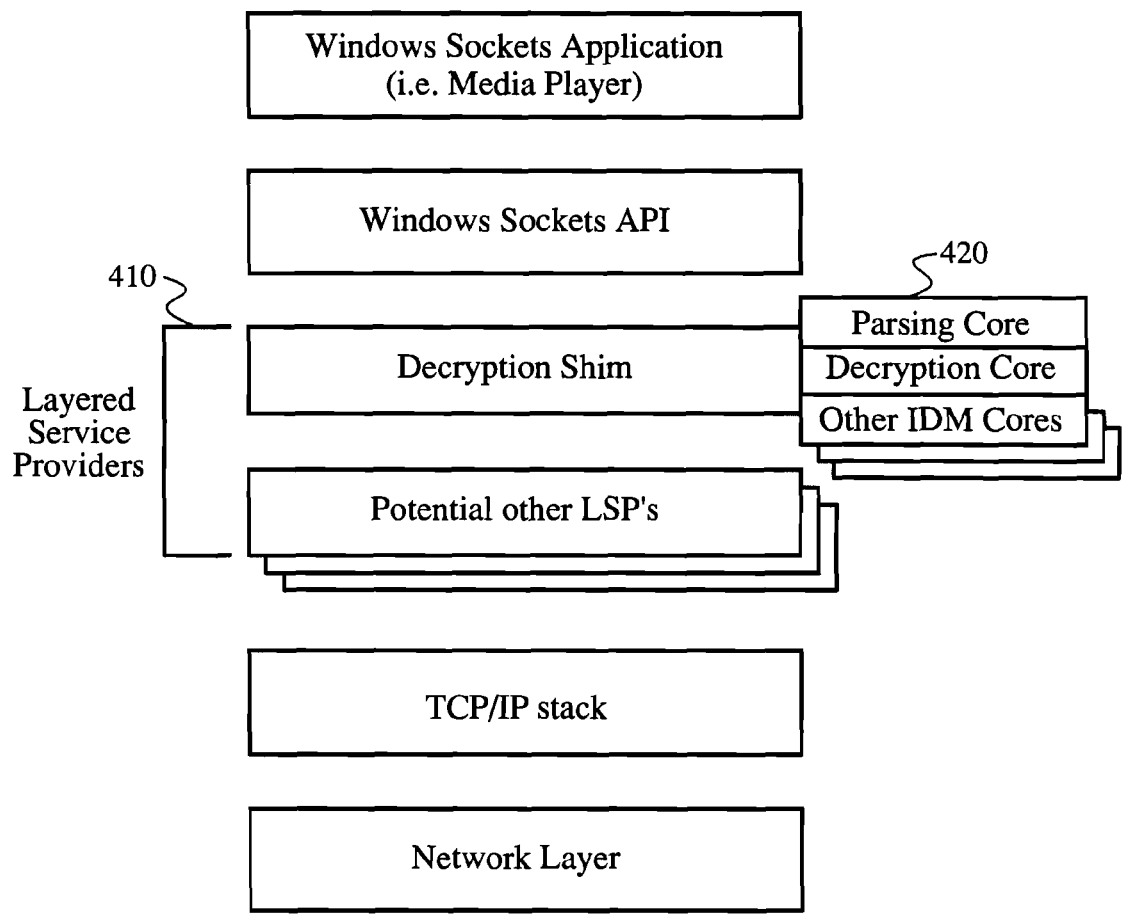
FIG. 4 is an exemplary diagram of a shim used in a Windows™ Sockets Network Architecture.
Figure 5:
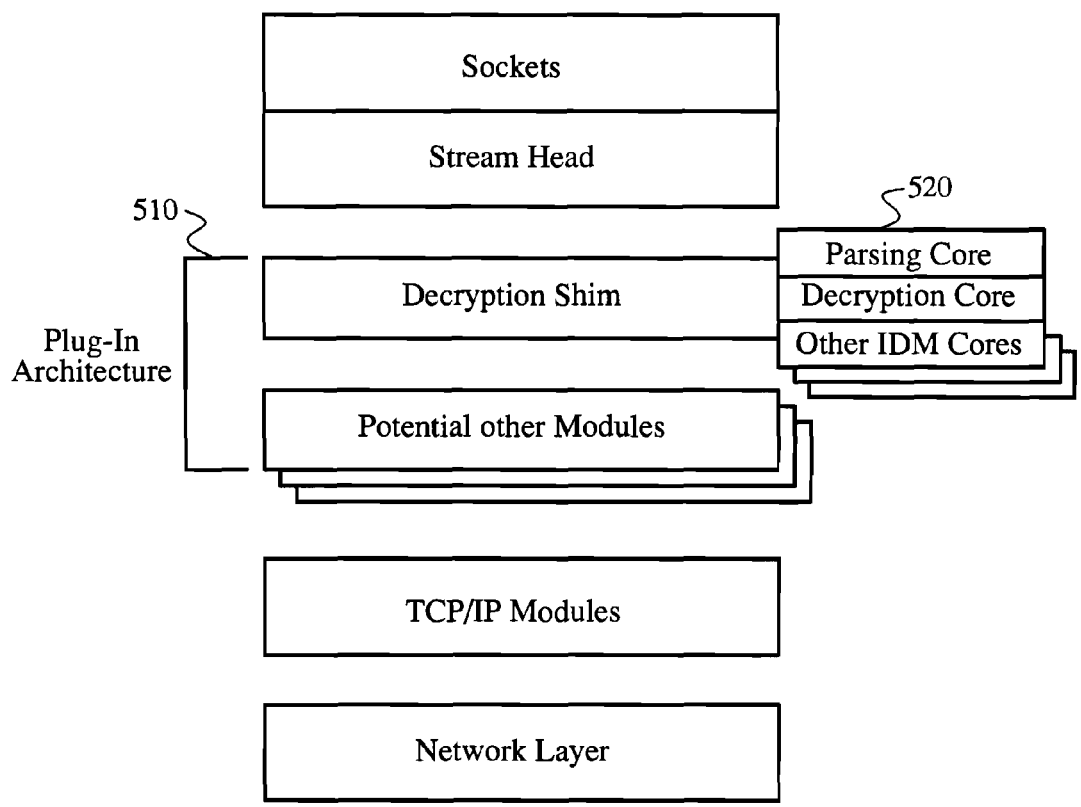
FIG. 5 is an exemplary diagram of a shim used in a Streams-Based Network Architecture.

Decryption is accomplished by adding a decryption shim 420 in a Layered Service Provider 410 in a Windows™ sockets network architecture as shown in FIG. 4 or a streams plug-in 510 in a streams based network architecture as shown in FIG. 5. FIG. 4 is an exemplary diagram of a Windows™ sockets network architecture. In the Windows™ networking architecture, decryption shim 420 is the highest most Layered Service Provider (LSP) so that an additional LSP cannot merely spool decrypted data out into an insecure environment. This can be extrapolated to other sockets based networking protocols as well. FIG. 5 is an exemplary diagram of a streams based network architecture. The diagram represents placement of the invention's shim 520 within a streams based architecture 510 such as that employed by current incarnations of Mac OS™ and some versions of Unix.

When a user requests data that is encrypted by the EB of the invention, the transparent software is installed via an Active-X™ Control, a well documented means to deliver executable programs to a Windows™ computer. The installation of the decryption shim is transparent to the user and does not cause a reboot, restart of the user's browser or require user interaction. Some exceptions such as the Mac OS™ and Windows N™ or Windows 2000™ in secure environments or Linux or Unix based client machines because transparent installation requires administrative user privileges on the client machine and the ability of the client machine to receive programs via the Active-X™ mechanism.

After the last stream has finished, the decryption shim uninstalls as much of itself as possible, leaving only a small layer so that administrative user privileges are not required for future decryptions. The decryption shim is installed in volatile memory to reduce the changes of tampering by a third party.

After installation, the decryption shim decrypts only the data coming from the EB of the invention going to targeted players such as Windows Media™ Player, QuickTime™ Movie Player, Real Player™, etc. Decryption does not impact data targeted to other applications or media streams that are not encrypted by the EB of the invention.

The decryption shim runs on, for example, operating systems such as Windows 95™, Windows 98™, Windows ME™, Windows NT™, Windows 2000™ as well as Mac OS™ and numerous Linux and Unix distributions. Where Active-X™ based installation is possible, the installation of the decryption shim can be accomplished with most browsers such as Internet Explorer™ or Netscape™.

In sum, the EB of the invention drops in between the server and client and parses and encrypts a selected portion of the streamed data such as the media portion. As the stream is initiated, the decryption core is sent as part of the stream to the client side. The client can then decrypt the incoming data for the duration of the stream. If another, stream is initiated, decryption occurs the same way. For each stream, the encryption keys can be set for the duration of the stream or changed during the stream duration to increase security.

As an example, a client may request privileges to get streaming data from a service provider's e-commerce system. The service provider's back-end (server infrastructure)

will authorize the streaming server to initiate a stream. That stream is initiated through the EB. Once initiated, the stream is parsed and selectively encrypted by the EB before being passed out over the network. Encryption keys are exchanged, for example, by the Diffie-Hellman mechanism that is known in the field. Unique features of the invention include the parsing and selective encryption of only the payload part of the data stream and the ability to plug-in other key exchange mechanisms and encryption algorithms should customer or security needs dictate.

It will be apparent to one of ordinary skill in the art that the embodiments as described above may be implemented in many different embodiments of software, firmware and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The invention claimed is:

1. An apparatus for selectively encrypting data for transmission over a network in packets between a server and a client, the apparatus comprising:
    a parser configured to parse a payload portion of the data in a packet from a non-payload portion of the packet data;
    an encrypter configured to determine if the payload portion of the packet data is to be encrypted by examining the payload portion of the packet data to recognize a predefined data type, and if it is to be encrypted, to encrypt the payload portion of the packet data; and
    a data combiner configured to combine the encrypted payload portion of the packet data with the non-payload portion of the packet data, wherein the non-payload portion of the packet data includes more than routing information.

2. The apparatus of claim 1, wherein the packet data includes streaming data.

3. The apparatus of claim 1, wherein the non-payload portion of the packet data includes at least one of a header, control data and routing data.

4. The apparatus of claim 1, further comprising a transmitter configured to send the combined payload and non-payload portions of the packet data over the network to the client.

5. The apparatus of claim 1, further comprising a receiver configured to receive the data from the server before the data is sent in the packet over the network to the client.

6. The apparatus of claim 1, further comprising a device configured to establish a data stream between the server and the client.

7. The apparatus of claim 1, further comprising a key negotiator configured to negotiate an encryption key with the client.

8. The apparatus of claim 7, wherein key negotiation and key exchange occur during transmission of a stream.

9. The apparatus of claim 8, wherein the encrypter is transparent to the server.

10. The apparatus of claim 7, wherein key negotiation can determine if the encryption key is current.

11. The apparatus of claim 1, further comprising a decrypter configured to decrypt the encrypted payload portion of the packet data at the client.

12. The apparatus of claim 1, wherein the parser is further configured to parse the packet data into different portions based on a media format.

13. The apparatus of claim 1, wherein the encrypter is further configured to encrypt the payload portion of the packet data based on a media format.

14. The apparatus of claim 1, wherein the apparatus is implemented utilizing an application that includes a pluggable core encoding an encryption algorithm for encrypting the payload portion of the packet data, wherein the pluggable core enables the encryption algorithm to be readily changed.

15. The apparatus of claim 1, wherein the apparatus in implemented on an encryption bridge.

16. The apparatus of claim 1, wherein the payload packet data includes multimedia data.

17. The apparatus of claim 1, wherein the parser is further configured to parse the packet data into different portions based on a data protocol used to transmit a data stream of packets.

18. The apparatus of claim 1, wherein the parser parses the packet data based on a data protocol.

19. A method for selectively encrypting data in a packet received from a data source, the data including payload and non-payload portions which differ from each other in at least one characteristic, the received data to be subsequently sent over a network to a client, the method comprising:
    parsing the received packet data into portions including the payload and non-payload portions;
    determining if the payload portion is to be encrypted based on a format of the payload portion of the packet data by examining the payload portion of the packet data to recognize a predefined data type, and if it is to be encrypted, encrypting the payload portion of the received packet data; and
    sending the received packet data including the encrypted payload portion and the non-payload portion of the received packet data over the network to the client.

20. The method of claim 19, wherein the data source is a server.

21. The method of claim 19, further comprising determining whether a stream is established between a server and the client.

22. The method of claim 19, further comprising negotiating an encryption key with the client.

23. The method of claim 22, wherein the received packet data from the data source is streaming data sent during a streaming session and the negotiating of the encryption key is carried out during the streaming session.

24. The method of claim 22, wherein the received packet data from the data source is streaming data sent during a streaming session, the method further comprising examining the client during the streaming session and terminating the streaming session if the encryption key on the client is invalid.

25. The method of claim 22, wherein the encryption key is negotiated with a decryption shim on the client.

26. The method of claim 19, further comprising determining whether the received packet data is streaming data.

27. The method of claim 26, further comprising parsing, encrypting and sending the packet data if the packet data is streaming data and sending the packet data if the packet data is not streaming data.

28. The method of claim 19, further comprising determining whether a shim is present on the client.

29. The method of claim 28, further comprising sending a shim to the client if it is determined that the shim is not present on the client.

30. The method of claim 19, further comprising determining whether an encryption key on the client is current.

31. The method of claim 19, wherein the packet data includes at least one of a header, control data and routing data.

32. The method of claim 19, wherein the packet data received from the data source for sending to the client is a stream of packets, the method further comprising determining whether a particular packet is the last packet in a data stream.

33. The method of claim 32, further comprising receiving feedback from a decryption shim on the client if it is determined that the particular packet is not the last packet in the data stream.

34. The method of claim 19, further comprising determining whether the client is compromised.

35. The method of claim 34, further comprising continuing parsing, encrypting and sending the packet data into the payload and non-payload portions if it is determined that the client is not compromised.

36. The method of claim 34, further comprising terminating the sending to the client if it is determined that the client is compromised.

37. A method for streaming data at a client, the data including payload and non-payload portions which differ from each other in at least one characteristic, the streaming data is included in a plurality of packets having been sent over a network to the client from an encryption source, the method comprising:
receiving the packet data sent over the network;
parsing the packet data into portions including the payload and non-payload portions;
if the payload portion of the packet data is encrypted based on a format of the payload portion of the packet data, as determined by an examination of the payload portion of the packet data to recognize a predefined data type, decrypting the payload portion of the packet data; and
passing the decrypted payload portion of the packet data to a higher level of operations for play in the client.

38. The method of claim 37, further comprising prior to the parsing, determining whether the packet data is an unencrypted stream.

39. The method of claim 38, further comprising passing the packet data to a higher level of operations without parsing and decrypting if it is determined that the packet data is an unencrypted stream.

40. The method of claim 37, further comprising negotiating a decryption key with the encryption source.

41. The method of claim 40, wherein the streaming data is sent from the encryption source during a streaming session and said negotiating the decryption key is carried out during the streaming session.

42. The method of claim 40, further comprising terminating a stream if the decryption key is invalid.

43. The method of claim 42, wherein the terminating of the encrypted stream includes sending a feedback signal to the encryption source instructing to stop sending the packet data over the network.

44. The method of claim 37, wherein the packet data is sent from the encryption source over the network as a stream of data packets, the method further comprising determining whether a particular packet received by the client is a last packet in a data stream.

45. The method of claim 44, further comprising sending feedback to the encryption source if it is determined that the particular packet is not the last packet in the data stream.

46. The method of claim 37, further comprising determining whether the client is compromised.

47. The method of claim 46, further comprising continuing the parsing, decrypting and passing the packet data as aforesaid if it is determined that the client is not compromised.

48. The method of claim 46, further comprising terminating a streaming session if it is determined that the client is compromised.

49. The method of claim 37, further comprising terminating a streaming session based on a determination that the client is compromised.

50. A method for selectively encrypting data for transmission over a network, the method comprising:
receiving a plurality of packets;
examining the data of each received packet to identify a plurality of portions that include at least a payload portion and a non-payload portion;
determining if at least one of the payload portion is to be encrypted by examining the at least one payload portion to recognize a predefined data type, and if the at least one payload portion is to be encrypted, encrypting the at least one payload portion;
at least the non-payload portion of the packet to remain unencrypted, wherein the plurality of portions of encrypted payload and unencrypted non-payload for a packet being combined after such encryption determination.

51. The method of claim 50, wherein the packet data is received from a data source, wherein the packet data includes streaming data and wherein the at least one data portion of a packet to remain unencrypted includes at least one of a header, control data and routing data.

52. The method of claim 51, wherein the streaming data is included in the at least one data portion of the packet to remain unencrypted.

53. The method of claim 52, further comprising:
transmitting the combined packet data over the network to a client; and
negotiating and exchanging a key with the client before the combined data is transmitted over the network to the client, the key enabling the client to decrypt the encrypted portion of the packet data for play on the client.

54. The method of claim 53, wherein the streaming data is sent during a streaming session and wherein the negotiating and exchanging the key is carried out during the streaming session.

55. The method of claim 54, further comprising examining the client during the streaming session and terminating the streaming session if the key on the client is invalid.

56. The method of claim 55, wherein the data source is a server and the examining of the packet data is carried out on an encryption bridge between the server and the network so that the examining of the packet data, encrypting and combining of the plurality of data portions is transparent to the server.

57. The method of claim 56, wherein the key negotiating and exchanging and the decryption using the key is carried out using a shim on the client, the shim being configured so that the negotiating and exchanging of the key thereby and the decrypting of the data thereby is transparent to the client.

58. An apparatus for selectively encrypting streaming data packets received from a streaming data source for transmission over a network to a client, the apparatus comprising:
- a parser configured to parse a plurality of portions of the streaming data packets, wherein the plurality of portions include a payload portion and a non-payload portion in each of the streaming data packets;
- an encrypter configured to encrypt at least the payload portion if it is determined, based on an examination of a format of the payload portion to recognize a predefined data type, payload portion is to be encrypted, but not encrypt at least one other data portion of the plurality of data portions; and
- a data combiner configured to combine the encrypted payload portion with at least one unencrypted non-payload data portion.

59. The apparatus of claim 58, further comprising a negotiator, wherein the negotiator negotiates and exchanges a key with the client before the combined packet data is transmitted over the network to the client, the key enabling the client to decrypt the encrypted payload portion of the packet data for play on the client.

60. The apparatus of claim 59, wherein the streaming data is sent from the streaming data source during a streaming session.

61. The apparatus of claim 60, further configured to perform actions including examining the client during the streaming session and terminating the streaming session if the client has been compromised.

62. The apparatus of claim 58, wherein the at least one unencrypted data portion of the packet data includes at least one of a header, control data and routing data.

63. The apparatus of claim 58, wherein the streaming data source is at least one server.

64. An apparatus for selectively encrypting data received from a data source for transmission in packets over a network to a client, comprising:
- a parser configured to parse at least two portions of the packet data, at least one of the two portions of the packet data including more than routing information for a packet;
- an encrypter configured to determine if a payload portion of the packet data is to be encrypted based on an examination of the payload portion the packet data to recognize a predefined data type, and if it is to be encrypted, encrypting the payload portion of packet data not including the routing information for the packet; and
- a data combiner configured to combine the parsed at least two portions of the packet data following encryption of the payload portion of data not including the routing information for the packet.

65. The apparatus of claim 64, wherein an unencrypted portion of the packet data includes at least one of a header and control data.

66. The apparatus of claim 65, wherein the parser parses the data into different portions based on a data protocol used to transmit the data.

67. The apparatus of claim 65, wherein the portion of the packet data to be encrypted includes media data encoded in a media format and wherein the encrypter encrypts the packet data to be encrypted based on the media format.

68. The apparatus of claim 67, wherein the apparatus is implemented utilizing an application that includes a pluggable core encoding an encryption algorithm for encrypting the packet data, the pluggable core being replaceable to enable the encryption algorithm to be readily changed.

69. The apparatus of claim 68, wherein the apparatus is implemented on an encryption bridge.

70. An apparatus for selectively encrypting data received from a data source during a downloading operation, the data being received from the data source for transmission in packets over a network to a client receiving the downloaded packetized data, comprising:
- a parser configured to parse at least two portions of the data in a packet, wherein the packet data includes a payload portion and a non-payload portion;
- an encrypter configured to determine if the payload portion of the packet data is to be encrypted based on a format of the payload portion of the packet data, wherein the format is determined based on an examination of the payload portion of the packet data to recognize a predefined data type, and if it is to be encrypted, encrypting the payload portion of the packet data; and
- a data combiner configured to combine the encrypted payload portion of the packet data with an unencrypted portion of packet data for transmission over the network.

71. The apparatus as defined in claim 70, wherein the downloaded data is included in the encrypted payload portion of the packet data.

72. The apparatus of claim 71, wherein the unencrypted portion of packet data includes at least one of a header, control data and routing data.

73. The apparatus of claim 72, further comprising a key negotiator configured to perform actions including negotiating and exchanging a key with the client before the packet data is sent over the network to the client, the key enabling the client to decrypt the encrypted payload portion of data.

74. An apparatus for selectively encrypting data, received from a data source during a downloading operation and for selectively encrypting data received in packets from a data source during a streaming operation, the packet data being received from the data source for transmission over a network to a client receiving the downloaded or streaming data, comprising:
- a means for parsing at least two portions of the data included in a packet, wherein the packet data comprises at least a payload portion and a non-payload portion;
- a means for determining if the payload portion of the at least two portions of data is to be encrypted based on a format of the one portion of packet data that is determined by recognizing a predefined data type in the payload portion of the at least two portions, and if the a payload portion of data is to be encrypted, employing a means for encrypting only the payload portion of the at least two portions of data; and
- a means for combining the encrypted payload portion of the packet data with at least the unencrypted portion of the packet data for transmission over the network.

75. The apparatus of claim 74, wherein during the streaming operation, the streaming data is included in the packet data portion that is to be encrypted.

76. The apparatus as defined in claim 75, further comprising a key negotiating means configured to negotiate and exchange a key with the client before the streaming data is sent over the network to the client, the key enabling the client to decrypt the encrypted payload portion of the packet data for play on the client.

77. The apparatus of claim 74, further comprising a client examining means configured to examine the client during a streaming session and terminate the streaming session if the client has been compromised.

78. The apparatus of claim 77, wherein the packet data portion that is not encrypted includes at least one of a header, control data and routing data.

79. The apparatus of claim 74, wherein during a downloading operation, the downloaded data is included in the packet data portion that is to be encrypted.

80. The apparatus of claim 79, wherein the data portion that is not encrypted includes at least one of a header, control data and routing data.

81. A shim deployed on a client, the shim comprising:
- a data receiver configured to receive partially encrypted packet data transmitted to the client, wherein another device parsed the packet data into a payload portion and a non-payload portion and determined the payload portion of the packet data to be encrypted based on a format of the payload portion of the packet data, wherein the format is determined by an examination of that payload portion of the packet data to recognize a predefined data type;
- a parser configured to parse the partially encrypted packet data to select the payload portion of the packet data to be decrypted;
- a decrypter configured to decrypt the payload portion of the packet data selected for decrypting by the parser; and
- a data transmitter configured to send the decrypted packet data to a higher level operation resident on the client.

82. The shim of claim 81, wherein an encrypted portion of the transmitted packet data includes media data, the data transmitter being further configured to send the decrypted media data to a media player resident on the client.

83. The shim of claim 82, wherein the media data is streaming media transmitted to the client during a streaming session.

84. The shim of claim 83, wherein the unencrypted portion of the packet data includes at least one of a header, control data and routing data.

85. The shim of claim 83, further comprising an analyzer configured to analyze a behavior of the client to detect known media piracy techniques and to terminate the streaming session if a known media piracy technique is detected.

86. The shim of claim 83, further comprising an analyzer configured to analyze a behavior of the client to detect suspicious client behavior and to terminate the streaming session if specific behavior is detected.

87. The shim of claim 83, further comprising an analyzer configured to analyze a behavior of the client to detect known media piracy techniques and to terminate operation of at least the decrypter when a media piracy technique is detected.

88. The shim of claim 83, further comprising an analyzer configured to analyze a behavior of the client to detect suspicious client behavior and to terminate the operation of at least the decrypter if suspicious behavior is detected.

89. The shim of claim 83, further comprising a key negotiator configured to negotiate and exchange a key with the client before the packet data is sent over the network to the client, the key enabling the client to decrypt the encrypted portion of the packet data for play on the client.

90. The shim of claim 83, wherein the streaming data is sent to the client from an encryption source, the shim further including a key negotiator configured to negotiate and exchange a key with the encryption source, the key being used by the decrypter to decrypt the encrypted portion of the packet data.

91. The shim of claim 90 wherein the key negotiator is further configured to carry out the negotiating and exchanging of the key with the encryption source during the streaming session.

92. A method for providing data in packets over a network, comprising:
- determining a plurality of portions of data in a packet that includes a payload portion and a non-payload portion;
- determining if at least the payload portion of the plurality of portions of the packet data is to be encrypted based an examination of the payload portion, wherein the examination is to recognize a predefined data type and if the payload portion is to be encrypted, selectively encrypting the payload portion in the plurality of portions, wherein at least one other non-payload portion remains unencrypted;
- authenticating a client to receive the packet that includes the selectively encrypted payload portion; and
- transmitting the packet that includes the selectively encrypted payload portion to the authenticated client.

93. The method of claim 92, wherein authenticating the client further comprises the client accepting a shim transmitted from a server that is selectively encrypting the payload portion, and wherein the shim is configured to send back a confirmation.

94. The method of claim 92, wherein authenticating the client further comprises the client transmitting a self-generated certificate.

* * * * *

UNITED STATES PATENT AND TRADEMARK OFFICE
CERTIFICATE OF CORRECTION

| | | |
|---|---|---|
| PATENT NO. | : 7,165,175 B1 | Page 1 of 1 |
| APPLICATION NO. | : 09/656166 | |
| DATED | : January 16, 2007 | |
| INVENTOR(S) | : Brad Kollmyer et al. | |

It is certified that error appears in the above-identified patent and that said Letters Patent is hereby corrected as shown below:

Title page, item [56]

Page 2 Col. 1; Line 65; After "6,314,409" delete "B1" and insert -- B2 --, therefor.

Page 2 Col. 2; Line 3; After 6,409,080" delete "B1" and insert -- B2 --, therefor.

Page 2 Col. 2; Line 16; After "6,634,028" delete "B1" and insert -- B2 --, therefor.

Page 2 Col. 2; Line 20; After "6,654,423" delete "B1" and insert -- B2 --, therefor.

Column 10; Line 3; Delete "384," and insert -- 384; --, therefor.

Signed and Sealed this

Tenth Day of April, 2007

JON W. DUDAS
*Director of the United States Patent and Trademark Office*

US007165175C1

(12) INTER PARTES REEXAMINATION CERTIFICATE (0391st)
United States Patent
Kollmyer et al.

(10) Number: US 7,165,175 C1
(45) Certificate Issued: Jun. 19, 2012

(54) APPARATUS, SYSTEM AND METHOD FOR SELECTIVELY ENCRYPTING DIFFERENT PORTIONS OF DATA SENT OVER A NETWORK

(75) Inventors: Brad Kollmyer, Lynden, WA (US); Brian Baker, Bellevue, WA (US); Eric Shapiro, Ann Arbor, MI (US); Aric Kollmyer, Mercer Island, WA (US); Mike Rutman, Gainesville, FL (US); Duncan MacLean, Santa Monica, CA (US); Dan Robertson, Ann Arbor, MI (US); Neal Taylor, Yorba Linda, CA (US); Dick Hunsche, Ann Arbor, MI (US); Amanda Walker, Reston, VA (US)

(73) Assignee: Constellation Venture Capital II, L.P., New York, NY (US)

Reexamination Request:
No. 95/000,325, Apr. 18, 2008

Reexamination Certificate for:
Patent No.: 7,165,175
Issued: Jan. 16, 2007
Appl. No.: 09/656,166
Filed: Sep. 6, 2000

Certificate of Correction issued Apr. 10, 2007.

(51) Int. Cl.
*H04L 9/00* (2006.01)

(52) U.S. Cl. .................... 713/154; 348/E7.056; 709/232
(58) Field of Classification Search ........................ None
See application file for complete search history.

(56) References Cited

To view the complete listing of prior art documents cited during the proceeding for Reexamination Control Number 95/000,325, please refer to the USPTO's public Patent Application Information Retrieval (PAIR) system under the Display References tab.

*Primary Examiner* — Matthew Heneghan

(57) ABSTRACT

An apparatus and method for selectively encrypting portions of data sent over a network between a server and a client. The apparatus includes parsing means for separating a first portion of the data from a second portion of the data, encrypting means for encrypting only of the first portion of the data, and combining means for combining the encrypted first portion of the data with the second portion of the data, wherein the second portion of the data is not encrypted. The apparatus further includes decrypting means installed at the client for decrypting the encrypted portion of the data. The apparatus is platform independent in terms of media format and data protocol. The encryption unit encrypts data transparently to the client based on the media format. The apparatus of the invention is implemented as one of an application and a plug-in object. The method for selectively encrypting portions of data which differ from each other in at least on characteristic sent over a network between a server and a client includes parsing the data into a first and second portion, encrypting only the first portion of the data, and sending the encrypted first portion and the second portion of the data over the network to the client. The method further includes receiving data from the server, determining whether a data stream is established between the server and the client, and negotiating an encryption key with a decryption shim of the client.

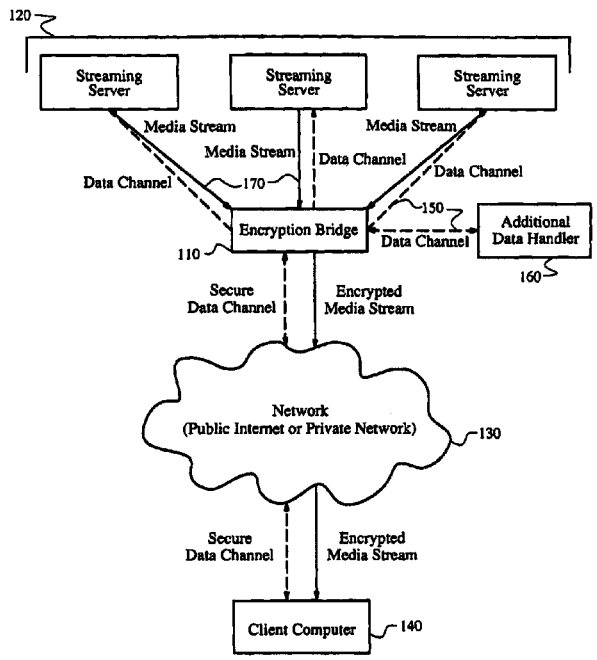

US 7,165,175 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 37-44, 46-63 and 81-91 is confirmed.

Claims 7, 22, 65-68, 71-73, 77 and 93 are cancelled.

Claims 1, 8, 10, 19, 23-25, 64, 69, 70, 74, 78 and 92 are determined to be patentable as amended.

Claims 2-6, 9, 11-18, 20, 21, 26-36, 75, 76, 79, 80 and 94, dependent on an amended claim, are determined to be patentable.

New claims 95-116 are added and determined to be patentable.

Claim 45 was not reexamined.

1. An apparatus for selectively encrypting data for transmission over a network in packets between a server and a client, the apparatus comprising:
   a key negotiator configured to negotiate an encryption key with the client;
   a parser configured to parse a payload portion of the data in a packet from a non-payload portion of the packet data;
   an encrypter configured to determine if the payload portion of the packet data is to be encrypted by examining the payload portion of the packet data to recognize a predefined data type, and if it is to be encrypted, to encrypt the payload portion of the packet data; and
   a data combiner configured to combine the encrypted payload portion of the packet data with the non-payload portion of the packet data, wherein the non-payload portion of the packet data includes more than routing information.

8. The apparatus of claim [7]*1*, wherein key negotiation and key exchange occur during transmission of a stream.

10. The apparatus of claim [7]*1*, wherein key negotiation can determine if the encryption key is current.

19. A method for selectively encrypting data in a packet received from a data source, the data including payload and non-payload portions which differ from each other in at least one characteristic, the received data to be subsequently sent over a network to a client, the method comprising:
   parsing the received packet data into portions including the payload and non-payload portions;
   *negotiating an encryption key with the client;*
   determining if the payload portion is to be encrypted based on a format of the payload portion of the packet data by examining the payload portion of the packet data to recognize a predefined data type, and if it is to beencrypted, encrypting the payload portion of the received packet data; and
   sending the received packet data including the encrypted payload portion and the non-payload portion of the received packet data over the network to the client.

23. The method of claim [22]*19*, wherein the received packet data from the data source is streaming data sent during a streaming session and the negotiating of the encryption key is carried out during the streaming session.

24. The method of claim [22]*19*, wherein the received packet data from the data source is streaming data sent during a streaming session, the method further comprising examining the client during the streaming session and terminating the streaming session if the encryption key on the client is invalid.

25. The method of claim [22]*19*, wherein the encryption key is negotiated with a decryption shim on the client.

64. An apparatus for selectively encrypting data received from a data source for transmission in packets over a network to a client, comprising:
   a parser configured to parse at least two portions of the packet data, at least one of the two portions of the packet data including more than routing information for a packet, *wherein the parser parses the data into different portions based on a data protocol used to transmit the data*;
   an encrypter configured to determine if a payload portion of the packet data is to be encrypted based on an examination of the payload portion the packet data to recognize a predefined data type, and if it is to be encrypted, encrypting the payload portion of packet data not including the routing information for the packet, *wherein the portion of the packet data to be encrypted includes media data encoded in a media format and wherein the encrypter encrypts the packet data to be encrypted based on the media format, and wherein an unencrypted portion of the packet data includes at least one of a header and control data*; and
   a data combiner configured to combine the parsed at least two portions of the packet data following encryption of the payload portion of data not including the routing information for the packet; *and*
   *wherein the apparatus is implemented utilizing an application that includes a pluggable core encoding an encryption algorithm for encrypting the packet data, the pluggable core being replaceable to enable the encryption algorithm to be readily changed.*

69. The apparatus of claim [68]*64*, wherein the apparatus is implemented on an encryption bridge.

70. An apparatus for selectively encrypting data received from a data source during a downloading operation, the data being received from the data source for transmission in packets over a network to a client receiving the downloaded packetized data, comprising:
   a parser configured to parse at least two portions of the data in a packet, wherein the packet data includes a payload portion and a non-payload portion;
   *a key negotiator configured to perform actions including negotiating and exchanging a key with the client before the packet data is sent over the network to the client, the key enabling the client to decrypt the encrypted payload portion of data*;
   an encrypter configured to determine if the payload portion of the packet data is to be encrypted based on a format of the payload portion of the packet data, wherein the format is determined based on an examination of the payload portion of the packet data to recognize a predefined data type, and if it is to be encrypted, encrypting the payload portion of the packet data, *wherein the downloaded data is included in the encrypted payload portion of the packet data, and wherein the unencrypted portion of packet data includes at least one of a header, control data and routing data*; and a data combiner configured to combine the encrypted payload portion of the packet data with an unencrypted portion of packet data for transmission over the network.

74. An apparatus for selectively encrypting data, received from a data source during a downloading operation and for selectively encrypting data received in packets from a data source during a streaming operation, the packet data being received from the data source for transmission over a network to a client receiving the downloaded or streaming data, comoprising:

a means for parsing at least two portions of the data included in a packet, wherein the packet data comprises at least a payload portion and a non-payload portion;

a means for determining if the payload portion of the at least two portions of data is to be encrypted based on a format of the one portion of packet data that is determined by recognizing a predefined data type in the payload portion of the at least two portions, and if the a payload portion of data is to be encrypted, employing a means for encrypting only the payload portion of the at least two portions of data; [and]

a means for combining the encrypted payload portion of the packet data with at least the unencrypted portion of the packet data for transmission over the network; *and*

*a client examining means configured to examine the client during a streaming session and terminate the streaming session if the client has been compromised.*

78. The apparatus of claim [77]*74*, wherein the packet data portion that is not encrypted includes at least one of a header, control data and routing data.

92. A method for providing data in packets over a network, comprising:

determining a plurality of portions of data in a packet that includes a payload portion and a non-payload portion;

determining if at least the payload portion of the plurality of portions of the packet data is to be encrypted based an examination of the payload portion, wherein the examination is to recognize a predefined data type and if the payload portion is to be encrypted, selectively encrypting the payload portion in the plurality of portions, wherein at least one other non-payload portion remains unencrypted;

authenticating a client to receive the packet that includes the selectively encrypted payload portion, *wherein authenticating the client further comprises the client accepting a shim transmitted from a server that is selectively encrypting the payload portion, and wherein the shim is configured to send back a confirmation*; and transmitting the packet that includes the selectively encrypted payload portion to the authenticated client.

95. *An apparatus for selectively encrypting data for transmission over a network in packets between a server and a client, the apparatus comprising:*

*a parser configured to parse a payload portion of the data in a packet from a non-payload portion of the packet data;*

*an encrypter configured to determine if the payload portion of the packet data is to be encrypted by examining the payload portion of the packet data to recognize a predefined data type, and if it is to be encrypted, to encrypt the payload portion of the packet data;*

*a data combiner configured to combine the encrypted payload portion of the packet data with the non-payload portion of the packet data, wherein the non-payload portion of the packet data includes more than routing information; and*

*a key negotiator configured to negotiate an encryption key with the client, wherein the key negotiation can determine if the encryption key is current, and wherein key negotiation and key exchange occur during transmission of a stream.*

96. *The apparatus of claim 95, wherein the apparatus is implemented on an encryption bridge.*

97. *The apparatus of claim 95, further comprising a device configured to establish a data stream between the server and the client.*

98. *The apparatus of claim 95, wherein the encrypter is transparent to the server.*

99. *The apparatus of claim 95, wherein the apparatus is implemented utilizing an application that includes a pluggable core encoding an encryption algorithm for encrypting the payload portion of the packet data, wherein the pluggable core enables the encryption algorithm to be readily changed.*

100. *A method for selectively encrypting data in a packet received from a data source, the data including payload and non-payload portions which differ from each other in at least one characteristic, the received data to be subsequently sent over a network to a client, the method comprising:*

*parsing the received packet data into portions including the payload and non-payload portions, wherein the packet data received from the data source for sending to the client is a stream of packets;*

*determining if the payload portion is to be encrypted based on a format of the payload portion of the packet data by examining the payload portion of the packet data to recognize a predefined data type, and if it is to be encrypted, encrypting the payload portion of the received packet data;*

*determining whether an encryption key on the client is current;*

*sending the received packet data including the encrypted payload portion and the non-payload portion of the received packet data over the network to the client; and*

*determining whether a particular packet is the last packet in a data stream by receiving feedback from a decryption shim on the client if it is determined that the particular packet is the last packet in the data stream.*

101. *The method of claim 100, further comprising negotiating the encryption key with the client.*

102. *The method of claim 101, wherein the received packet data from the data source is streaming data sent during a streaming session and the negotiating of the encryption key is carried out during the streaming session.*

103. *The method of claim 101, wherein the received packet data from the data source is streaming data sent during a streaming session, the method further comprising examining the client during the streaming session and terminating the streaming session if the encryption key on the client is invalid.*

104. *The method of claim 101, wherein the encryption key is negotiated with a decryption shim on the client.*

105. The method of claim 101, further comprising determining whether a shim is present on the client.

106. The method of claim 105, further comprising sending a shim to the client if it is determined that the shim is not present on the client.

107. The method of claim 101, further comprising determining whether the client is compromised.

108. A method for selectively encrypting data for transmission over a network, the method comprising:

receiving a plurality of packets, wherein the packet data is received from a data source, and wherein the packet data includes streaming data;

examining the data of each received packet to identify a plurality of portions that include at least a payload portion and a non-payload portion;

determining if at least one of the payload portion is to be encrypted by examining the at least one payload portion to recognize a predefined data type, and if the at least one payload portion is to be encrypted, encrypting the at least one payload portion;

at least the non-payload portion of the packet to remain unencrypted, wherein the plurality of portions of encrypted payload and unencrypted non-payload for a packet being combined after such encryption determination, and wherein at least one data portion of a packet to remain unencrypted includes at least one of a header, control data and routing data;

transmitting the combined packet data over the network to a client; and negotiating and exchanging a key with the client before the combined data is transmitted over the network to the client, the key enabling the client to decrypt the encrypted portion of the packet data for play on the client.

109. The method of claim 108, wherein the streaming data is sent during a streaming session and wherein the negotiating and exchanging the key is carried out during the streaming session.

110. The method of claim 109, further comprising examining the client during the streaming session and terminating the streaming session if the key on the client is invalid.

111. The method of claim 110, wherein the data source is a server and the examining of the packet data is carried out on an encryption bridge between the server and the network so that the examining of the packet data, encrypting and combining of the plurality of data portions is transparent to the server.

112. The method of claim 111, wherein the key negotiating and exchanging and the decryption using the key is carried out using a shim on the client, the shim being configured so that the negotiating and exchanging of the key thereby and the decrypting of the data thereby is transparent to the client.

113. An apparatus for selectively encrypting streaming data packets received from a streaming data source for transmission over a network to a client, the apparatus comprising:

a parser configured to parse a plurality of portions of the streaming data packets, wherein the plurality of portions include a payload portion and a non-payload portion in each of the streaming data packets;

an encrypter configured to encrypt at least the payload portion if it is determined, based on an examination of a format of the payload portion to recognize a predefined data type, payload portion is to be encrypted, but not encrypt at least one other data portion of the plurality of data portions;

a data combiner configured to combine the encrypted payload portion with at least one unencrypted non-payload data portion, wherein the streaming data is sent from the streaming data source during a streaming session;

a negotiator, wherein the negotiator negotiates and exchanges a key with the client before the combined packet data is transmitted over the network to the client, the key enabling the client to decrypt the encrypted payload portion of the packet data for play on the client; and wherein the apparatus examines the client during the streaming session and terminates the streaming session if the client has been compromised.

114. The apparatus of claim 113, wherein the at least one unencrypted data portion of the packet data includes at least one of a header, control data and routing data.

115. The apparatus of claim 113, wherein the streaming data source is at least one server.

116. A method for providing data in packets over a network, comprising:

determining a plurality of portions of data in a packet that includes a payload portion and a non-payload portion;

determining if at least the payload portion of the plurality of portions of the packet data is to be encrypted based an examination of the payload portion, wherein the examination is to recognize a predefined data type and if the payload portion is to be encrypted, selectively encrypting the payload portion in the plurality of portions, wherein at least one other non-payload portion remains unencrypted;

authenticating a client to receive the packet that includes the selectively encrypted payload portion, wherein authenticating the client further comprises the client accepting a shim transmitted from a server that is selectively encrypting the payload portion, and wherein the shim is configured to send back a confirmation, and wherein authenticating the client further comprises the client transmitting a self-generated certificate; and transmitting the packet that includes the selectively encrypted payload portion to the authenticated client.

\* \* \* \* \*